United States Patent
Knoedler et al.

(10) Patent No.: US 12,525,732 B2
(45) Date of Patent: Jan. 13, 2026

(54) ELECTRICAL CABLE OR ELECTRICAL LINE CONFIGURED WITH A PLUG-IN CONTOUR FOR PLUGGING DIRECTLY INTO A MATING PLUG

(71) Applicant: Kromberg & Schubert Automotive GmbH & Co. KG, Renningen (DE)

(72) Inventors: Michael Knoedler, Leinfelden-Echterdingen (DE); Wolfgang Langhoff, Leonberg (DE); Markus Polt, Leonberg (DE)

(73) Assignee: Kromberg & Schubert Automotive GmbH & Co. KG, Renningen (DE)

(*) Notice: Subject to any disclaimer, the term of this patent is extended or adjusted under 35 U.S.C. 154(b) by 320 days.

(21) Appl. No.: 18/137,880

(22) Filed: Apr. 21, 2023

(65) Prior Publication Data
US 2023/0344155 A1    Oct. 26, 2023

(30) Foreign Application Priority Data
Apr. 22, 2022 (DE) .......................... 102022109737.4

(51) Int. Cl.
| | |
|---|---|
| *H01R 4/48* | (2006.01) |
| *H01R 13/02* | (2006.01) |
| *H01R 13/24* | (2006.01) |
| *H01R 43/16* | (2006.01) |

(52) U.S. Cl.
CPC ............. *H01R 4/48* (2013.01); *H01R 13/025* (2013.01); *H01R 13/2414* (2013.01); *H01R 43/16* (2013.01)

(58) Field of Classification Search
CPC ...................................................... H01R 4/48
USPC ......................................................... 439/888
See application file for complete search history.

(56) References Cited

U.S. PATENT DOCUMENTS

| | | |
|---|---|---|
| 4,013,329 A | 3/1977 | Hugin |
| 10,931,038 B2 | 2/2021 | Hasui et al. |

FOREIGN PATENT DOCUMENTS

| | | | |
|---|---|---|---|
| CN | 110635256 A | 12/2019 | |
| DE | 7809981 U1 | 7/1978 | |
| DE | 102016123472 B3 | 10/2017 | |
| DE | 102018105772 B3 | 9/2019 | |
| EP | 4080685 A1 | 10/2022 | |
| WO | WO-2011113594 A1 * | 9/2011 | ........... H01R 13/113 |
| WO | 2022043133 A1 | 3/2022 | |

OTHER PUBLICATIONS

International Search Report and Written Opinion dated Jul. 19, 2023.

\* cited by examiner

*Primary Examiner* — Gary F Paumen
(74) *Attorney, Agent, or Firm* — Dickinson Wright PLLC

(57) ABSTRACT

A cable or electrical line and a method for producing a plug-in contour at a line end of an electrical line, such as a stranded line. The method includes forming, in particular press-forming, the electrical line at the line end while creating a plug-in section with at least one flat surface section at this line end, providing a contact strip, wherein the contact strip has a plurality of resilient contact lamellae projecting from the contact strip, and applying and connecting the contact strip to the surface section.

15 Claims, 3 Drawing Sheets

ELECTRICAL CABLE OR ELECTRICAL LINE CONFIGURED WITH A PLUG-IN CONTOUR FOR PLUGGING DIRECTLY INTO A MATING PLUG

RELATED APPLICATIONS

This application claims priority to German Patent Application No. 10 2022 109 737.4, filed Apr. 22, 2022, the entire contents of which are incorporated herein by reference in its entirety.

FIELD

The disclosure relates to electrical cables or electrical lines configured with a plug-in contour for plugging directly into a plug receptacle, e.g. on a mating plug, an interface, a contact socket or a plug.

BACKGROUND

In the prior art, there is no uniform terminology for plugs and sockets or male contacts and female contacts. In the terminology of the present disclosure, either male or female contacts can be used in a plug or socket. Male contacts are generally non-resilient contact geometries such as contact pins, pin contacts, flat contacts, or the like. Female contacts represent resilient contacts wherein at least one resilient contact element involved in contacting with a mating contact is present.

In this respect, a plug connection is implemented by a plug and a mating plug, wherein resilient contacts and non-resilient contact parts corresponding or cooperating with each other are optionally provided in the respective plugs and mating plugs.

Furthermore, a variety of connection solutions are known in the prior art for connecting an electrical contact element to an electrical line, e.g. a stranded conductor. The conventional techniques, such as soldering, welding, crimping and the like, are not discussed in the context of this disclosure since these methods are sufficiently described in the prior art and normatively described in the IEC 60325 series of standards.

DIN EN 60352-2 contains requirements, tests and application notes for solderless crimp connections made with stranded wire conductors of 0.05 mm2 to 10 mm2 cross-section or with solid conductors of 0.25 mm to 3.6 mm diameter and with suitable non-insulated or pre-insulated crimp sleeves.

Much larger cable cross-sections cannot currently be easily connected to a contact element in an efficient and cost-effective manner. Not only the manufacturing technology, but also the contact geometry and contact design are complex and expensive.

The components of alternative drives in automotive engineering are increasingly being designed to be pluggable for ease of assembly and service with regard to their electrical contacting properties. The plug-in connections are subject to the highest demands in terms of electrical contacting properties, robustness, tightness and installation space.

DE 102013004708 A1 relates to an electrical stranded conductor made of copper for parallel and/or serial contacting of circular plug-type contacts having a line cross-section, wherein at least one section of the stranded conductor has a section with a reduced cross-section that is compacted in cross-section, and a cylindrical circular plug-type contact socket or a cylindrical circular plug-type contact pin is welded to this section.

Another considerable problem in the prior art is the use of copper as a connecting means since it is difficult or impossible to connect copper in a reliable manner to a contact element by welding, as is required in the automotive industry.

If, for example, the detachable plug contacts are made of a first material that is different from copper or comprises an alloy in which copper is only present to a reduced extent, there is a particular problem in terms of connecting the plug-in contacts to the copper conductor.

In the prior art, therefore, crimp connections are primarily used to make the connection in a secure manner.

BRIEF SUMMARY

The present disclosure is therefore based on the object of providing a solution for making a simple and inexpensive contact between an electrical interface and an electrical line.

This object is achieved by the combination of features according to patent claim 1.

One idea of the present disclosure is to modify a conventional electrical line (cable) in such a manner that the line itself, or the line end, is configured as a plug-in contour. Proposed according to the disclosure is therefore a method for producing such a plug-in contour at a line end of an electrical line, in particular a stranded line, comprising the following steps:

a. forming, in particular press-forming, the electrical line at the line end, creating a (preferably compacted) plug-in section with at least one flat surface section at this line end, b. providing a contact strip (contact lamella strip), wherein the contact strip has a plurality of resilient contact lamellae projecting from the contact strip, and c. applying and connecting the contact strip to the surface section.

Furthermore, the term electrical line is also to be understood as an electrical conductor, such as a rigid bus bar. Instead of compacting or forming an electrical conductor, it is also conceivable in terms of the disclosure to use a (solid) bus bar and then to carry out steps b) and c) on the surface of the bus bar.

In this case, the contact strip is to be applied in such a manner that the contact lamellae project on the upper side opposite the connection side and can act there as resilient lamellae when plugging into a mating plug-in element.

It is further preferred that the electrical line has a substantially round cross-sectional shape in the adjacent non-formed region of the line adjoining the formed region. Round in the meaning of the present disclosure is a cross-sectional shape of typical round conductors which is not always perfectly round but approximately round.

In a further advantageous configuration of the disclosure, it is provided that during forming, a substantially parallelepiped-shaped line section is formed, preferably compacted. This is to be done in such a manner that the strands of the stranded conductor are locally baked and compressed together, which can be achieved in particular by a compacting method.

It is thus further advantageous if the line end is processed by means of compacting and, in particular, is brought into a shape in which the plug-in section is configured with a flat upper side and a flat lower side substantially parallel thereto. This provides a simple plug-in contour in a basic shape suitable for a plugging operation.

In a further advantageous configuration of the disclosure, it is provided that such a contact strip, contact lamella strip is provided on which a plurality of contact lamellae arranged in parallel are provided and the contact lamella strip is applied to one of the surface sections at the line end in such an oriented manner that the contact lamellae arranged in parallel are oriented either along or transversely, in particular 90° transversely, to the direction of extent of the cable.

A further aspect of the present disclosure also relates, in addition to the method described, to an electrical line, in particular a stranded electrical conductor having a line end which forms a plug-in section which has at least one flat, in particular planar, surface section and at least one contact lamella strip applied directly to the surface section and connected thereto, wherein the contact lamella strip has a plurality of (elastically) resilient contact lamellae projecting therefrom.

In an advantageous configuration of the line, it is provided that the electrical line has a substantially round cross-sectional shape in the adjacent non-formed region of the line adjoining the end-side plug-in section.

A further advantage is a solution in which the contact lamella strip has an edge-side web (32) on at least one edge region, on which web the plurality of contact lamellae are connected on one side and the other (opposite) end of the contact lamellae is configured as a free end.

Advantageously, the contact lamellae can be bent in the manner of a spoon back so that the contact point of the respective contact lamella lies approximately in the center of the surface section in the direction of extent of the contact lamellae and the ends of the contact lamellae end on or closely above the surface sections. For clarification of the preferred lamella course, reference is made to the figure in the section of the description of the exemplary embodiments.

In principle, however, other lamella shapes are also conceivable. In any case, according to the concept of the disclosure, it is advantageous if multiple, in particular 3, 4, 5, 6 or 7 lamellae are arranged next to each other.

An alternative embodiment provides that two opposite surface sections are formed on the plug-in section and preferably a contact lamella strip connected thereto is applied and secured on each surface section. In this case, the alignment of the contact lamellae can be mirror-imaged or in opposite directions.

In an advantageous configuration of the line, it is further provided that at least one contact lamella strip protrudes laterally and/or at the end face with a projection beyond the outer contour of the plug-in section so that the respective projection forms a contact or stop surface for interaction with a mating surface on a corresponding mating plug which is appropriately shaped for plugging together. By means of a defined projection, the joining and plugging together with the mating plug-in element can be optimized.

The connection of the contact strip is advantageously made in a firmly bonding manner, particularly preferably at a plurality of connection points.

The concept of the disclosure is particularly suitable for electrical lines that have a line sheath. Then, in the method according to the disclosure, the line sheath is removed in a defined end section before compacting or generally forming, and the remaining line sheath can also serve as a stop for defining the plug-in depth.

BRIEF DESCRIPTION OF THE DRAWINGS

Other advantageous refinements of the disclosure are indicated in the subclaims or are illustrated in more detail below together with the description of the preferred embodiment of the disclosure with reference to the figures. In the figures:

DETAILED DESCRIPTION

The figures are merely schematic by way of example. Identical reference signs in the figures indicate identical functional and/or structural features.

Figure 1:
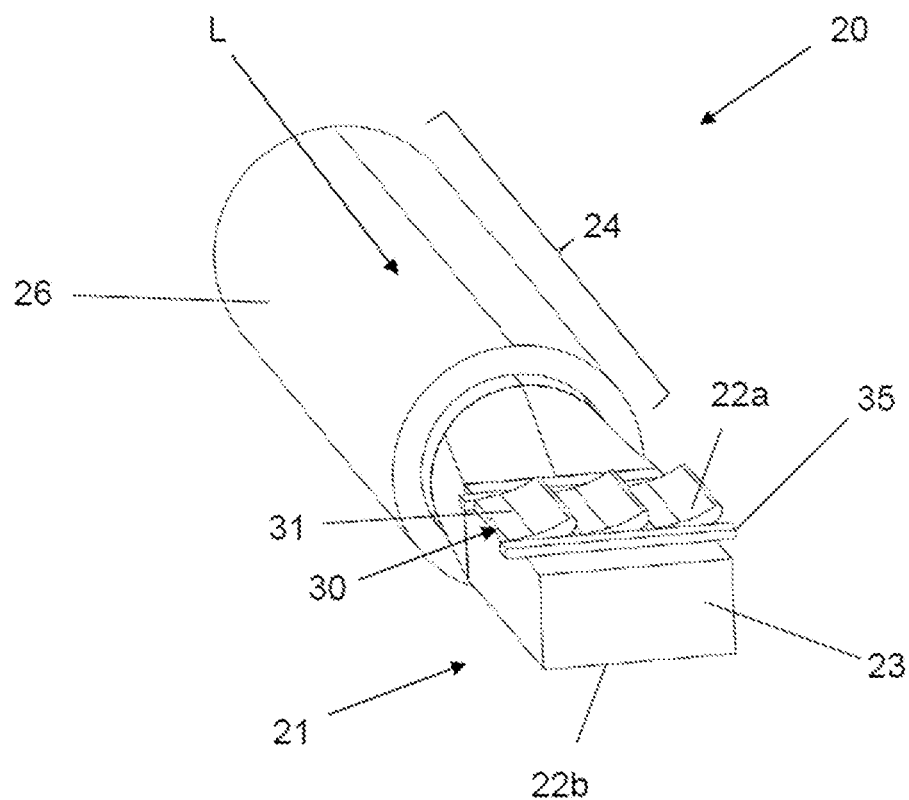
FIG. 1 shows a line section according to the disclosure with a plug-in contour.
Figure 2:
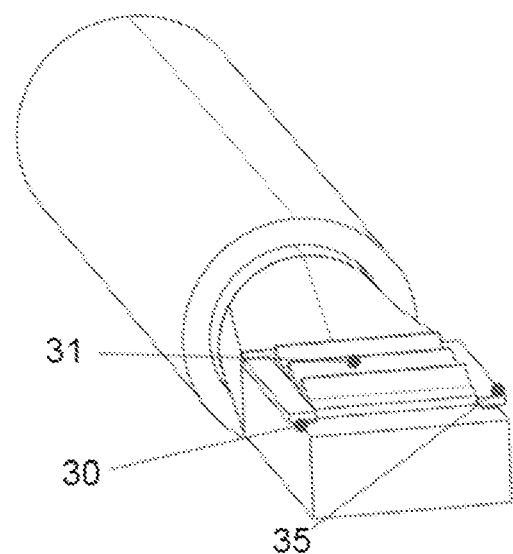
FIG. 2 shows an alternative embodiment of a line according to the disclosure with a plug-in contour.

FIGS. 1 and 2 show two exemplary embodiments of a pluggable line 20. Illustrated in each case is a section of an electrical line 20 with the line end 23 forming a plug-in section 21.

In each of the two FIGS. 1, the plug-in section 21 has a cuboidal shape and an upper and a lower flat surface section 22a, 22b which are diametrically opposite to each other.

Figure 4:
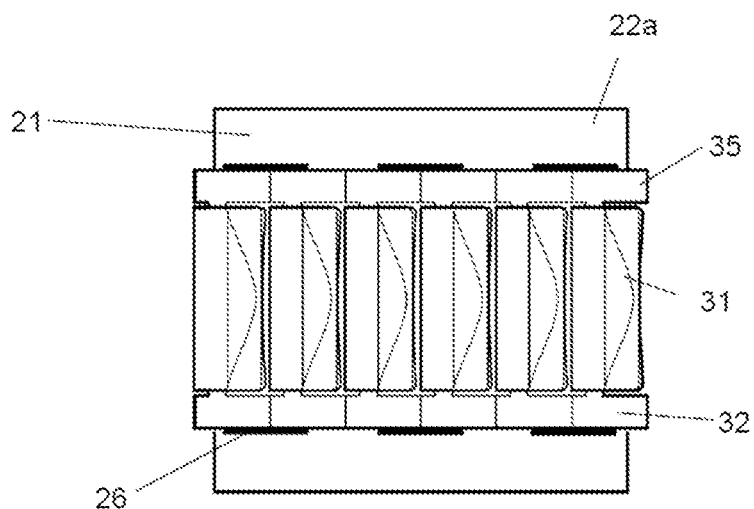
FIG. 4 shows a top view of the embodiment analogous to FIG. 3.

On the respective upper surface section 22a, a contact lamella strip 30 is secured in a firmly bonding manner and, as can be seen in FIG. 4, is connected at a plurality of firmly bonded connection points 36. Furthermore, it can be seen that the contact lamella strip 30 has a plurality of (in FIGS. 1 and 2, three in each case) contact lamellae 31 projecting (elastically) therefrom. The contact lamellae 31 project upwards so that these are provided at a mating contour for resilient contacting during the mating process. Due to the resilient properties, a contact force is obtained depending on the number of contact lamellae and their resilient characteristics, respectively.

Furthermore, it can be clearly seen in FIGS. 1 and 2 that the electrical line 20 has a substantially round cross-sectional shape in the adjacent non-formed region 24 of the line 20 adjoining the end-side plug-in section 21 and is formed with a cable sheath 26.

Figure 5:
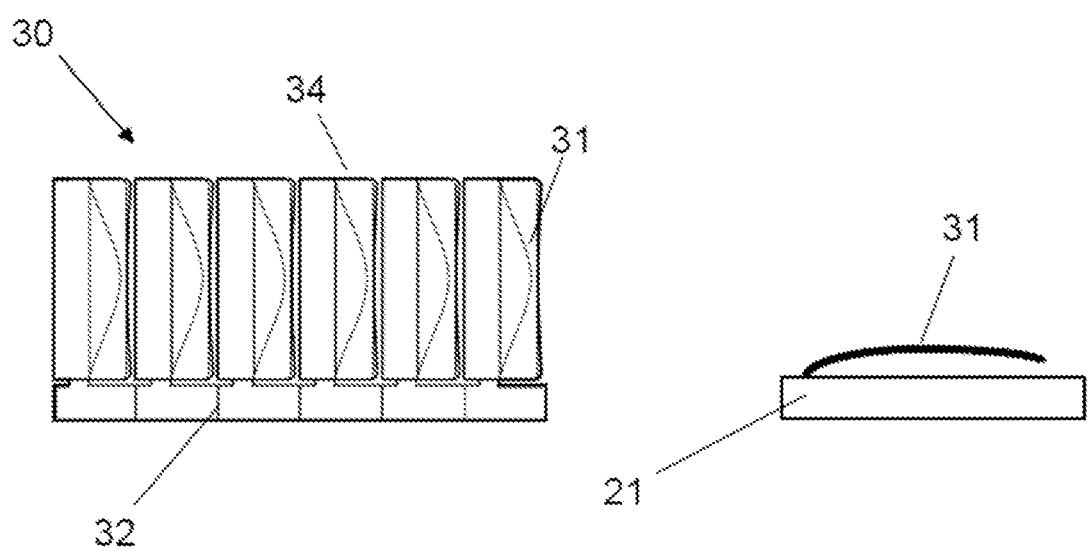
FIG. 5 shows a top and a side view of an alternative contact lamella strip.

FIG. 5 illustrates a configuration of a contact lamella strip 30. It has a web 32 at the edge of at least one edge region, at which web the multiple contact lamellae 31 are connected on one side and the other (opposite) end 34 of the contact lamellae 31 is configured as a free end. In this manner, resilient contact arms are obtained which, furthermore, have a shape as shown in the view shown next to them.

Figure 3:
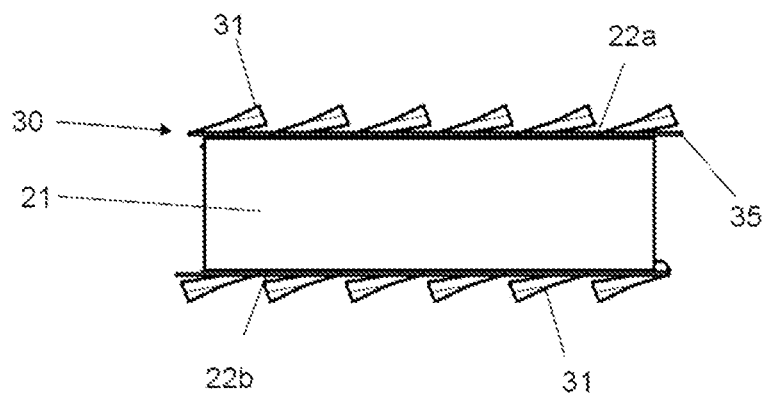
FIG. 3 shows a schematic end face view of a plug-in contour according to the disclosure.

In FIG. 3, two opposite surface sections 22a, 22b are formed on the plug-in section 21, and a contact lamella strip 30 connected thereto is applied and secured on each surface section 22a, 22b, wherein the contact lamellae are arranged in opposite directions with respect to their orientation. A mirror-image arrangement would alternatively be possible. It can also be seen that the contact lamella strip 30 protrudes laterally with a projection 35 beyond the outer contour of the plug-in section 21, so that a contact and stop surface for interaction with a mating surface on a corresponding mating plug suitably shaped for plugging together is formed by the respective projection 35. Such a configuration can also be seen in FIGS. 1 and 2.

The contact lamella strip 30 shown has in each case a plurality of (elastically) resilient contact lamellae 31 projecting therefrom.

The orientation of the contact lamellae in the embodiment of FIG. 1 is parallel to the direction of extent L of the line and in FIG. 2 is transverse thereto at a 90° angle.

The invention claimed is:

1. A method of producing a plug-in contour at a line end of an electrical line, forming a stranded line, comprising the following steps:
   a. press-forming the electrical line at the line end while creating a plug-in section with at least one flat surface section at this line end;
   b. providing a contact strip, wherein the contact strip has a plurality of resilient contact lamellae projecting from the contact strip; and
   c. applying and connecting the contact strip to the at least one flat surface section.

2. The method according to claim 1, wherein the electrical line has a substantially round cross-sectional shape in the adjoining adjacent non-formed region of the line.

3. The method according to claim 2, wherein during forming, a substantially parallelepiped-shaped line section is formed.

4. The method according to claim 1, wherein the line end is processed by way of compacting and is brought into a shape in which the plug-in section is formed with a flat upper side and a flat lower side substantially parallel thereto.

5. The method according to claim 1, wherein the plurality of contact lamellae are arranged in parallel and the contact lamella strip is applied onto one of the surface sections at the line end in such a manner that the contact lamellae arranged in parallel are oriented either along or transversely, in particular 90° transversely, to the direction of extent (L) of the cable.

6. A method of producing a plug-in contour at a line end of a bus bar having a surface, comprising the following steps:
   a. providing a contact strip, wherein the contact strip has a plurality of resilient contact lamellae projecting from the contact strip, and wherein the contact strip has an edge-side web on at least one edge region, and on the edge-side web the plurality of contact lamellae are connected on one side while the other opposite end of the contact lamellae is configured as a free end; and
   b. applying and connecting the contact strip to the surface of the bus bar.

7. The method according to claim 6, wherein the bus bar is solid.

8. The method according to claim 6, wherein the surface of the bus bar is flat and forms part of a parallelepiped-shaped section.

9. An electrical line having an electrical stranded conductor and a line end which forms a plug-in section which has at least one flat surface section and at least one contact lamella strip applied directly onto the flat surface section and connected thereto, wherein the contact lamella strip has a plurality of elastically resilient contact lamellae projecting therefrom.

10. The electrical line according to claim 9, wherein the electrical line has a substantially round cross-sectional shape in the adjacent non-formed region of the line adjoining the end-side plug-in section.

11. The electrical line according to claim 9, wherein the contact lamella strip has an edge-side web on at least one edge region, on which web the plurality of contact lamellae are connected on one side and the other (opposite) end of the contact lamellae is configured as a free end.

12. The electrical line according to claim 9, wherein, on the plug-in section, two opposite surface portions are formed and a contact lamella strip connected thereto is applied and secured on each surface portion.

13. The electrical line according to claim 9, wherein at least one contact lamella strip projects laterally and/or at the end face with a projection beyond the outer contour of the plug-in section, so that a contact and stop surface is formed by the respective projection for interaction with a mating surface on a corresponding mating plug appropriately shaped for plugging together.

14. The electrical line according to claim 9 wherein the line has a line sheath.

15. The electrical line according to claim 9, produced according to the method according to claim 1.

* * * * *